United States Patent Office 3,422,060
Patented Jan. 14, 1969

3,422,060
SILICON-, NITROGEN- AND OXYGEN-CONTAINING HIGH TEMPERATURE RESISTANT POLYMERS AND PROCESS
Walter Fink, Zurich, Switzerland, assignor to Monsanto Company, St. Louis, Mo., a corporation of Delaware
No Drawing. Filed Feb. 6, 1967, Ser. No. 613,996
Claims priority, application Switzerland, Feb. 14, 1966, 2,117/66
U.S. Cl. 260—46.5      20 Claims
Int. Cl. C08g 31/30; C07f 7/02

ABSTRACT OF THE DISCLOSURE

Silicon-, nitrogen- and oxygen-containing high temperature resistant polymers consisting of repeating units of the formula

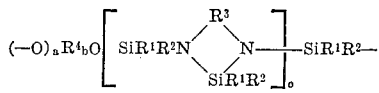

and process for making by reacting compounds of the formula

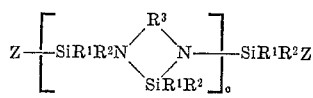

where Z is an amino group or a halogen atom, with a compound of the formula $R^4(OH)_d$ or an alkali salt thereof when Z is a halogen and $d$ is at least 2.

---

The present invention relates to silicon-, nitrogen- and oxygen-containing high temperature resistant polymers and to a process for preparing these polymers. The polymers consist of repeating units of the general formula (A) 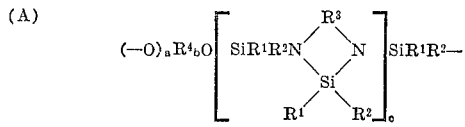

in which $R^1$ and $R^2$ are identical or different and signify fluorine atoms, possibly substituted and/or ethylenically or acetylenically unsaturated hydrocarbyl groups, heterocyclic groups, members of a heterocyclic group, or silyl groups, which organic groups and silyl groups each can be linked through an oxygen atom to the silicon atom; $R^3$ signifies a possibly substituted and/or ethylenically or acetylenically unsaturated bivalent hydrocarbon group or heterocyclic group, which contains the two nitrogen atoms being constituents of the diazasilacycloalkane ring in 1,2- or 1,3-, or ortho- or peri-position; $R^4$ signifies a silyl group, a hydrocarbyl group, a heterocyclic group, an ether group, or a group corresponding to an ether group showing S, $S_2$, SO, $SO_2$, NR', $NSiR^*_3$, $SiR^*_3$, $SiR^*_2SiR^*_2$, $SiR^*_2OSiR^*_2$, $SiR^*(SiR^*_3)SiR^*_2$, $SiR^*(OSiR^*_3)OSiR^*_2$, $Si(SiR^*_3)_2$, $Si(OSiR^*_3)_2$, $P(O)R''$, $P(S)R''$ or BR'' (R''=organic group as defined for $R^1$, which can be linked via an oxygen atom; R'=R'' or hydrogen atom; $R^*=R''$ or fluorine atom) in the place of an oxygen atom of the ether group; $a$ is an integer of 1–6 or, when $b$ is zero, it is also zero; $b$ is 1 or, when $a$ is zero, it is also zero; and $c$ is an integer of 1–10 and preferably 1. Normally, the R groups attached to the nitrogen atoms and to the silicon atoms either directly or through other groups such as oxygen, etc., as described in this specification and claims will not have more than 24 carbon atoms and, in many instances, not more than 8 carbon atoms. Also, in the polyhydroxy reactant normally an R group will not have more than 24 carbon atoms and for some purposes, preferably not more than 8.

Under the term "silyl group" is understood therein any silicon-containing group being attached through its silicon atom. Under the term "ether group" is understood herein in optional group derived from a dialkyl ether, poly(alkyl ether), dicycloalkyl ether, poly(cycloalkyl ether) diaryl ether, poly(aryl ether), diheterocycloalkyl ether, poly(heterocycloalkyl ether), as well as from a cyclic ether.

No polymeric compounds consisting of N,N'-disilylated diazasilacycloalkane units linked through ether groups, silanol groups or oxygen atoms have been known hitherto. The polymers of invention display extraordinary temperature resistance. They are converted, as an example, at temperatures at which the known silicones decompose and evaporate totally, into high temperature resistant masses. They can be used instead of many hitherto known polymers and then bring essential advantages.

It has now been found that the polymers formulated at the beginning are obtained if a monomeric to oligomeric N,N'-bis (aminosilyl) diazasilacycloalkane of the general formula (B) 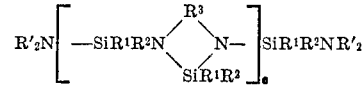

in which $R^1$, $R^2$, $R^3$ and $n$ are defined as above and $R'_2N$ signifies an amino group, i.e., the $H_2N$ group or a secondary or tertiary amino group derived from a primary or secondary amine which is more volatile than the hydroxy compound to be reacted and a hydroxy compound of the general formula (C)      $R^4(OH)_d$ in which $R^4$ is defined as above and $d$ is an integer of at least 2, are heated with or without solvent at a temperature sufficient to split off ammonia or amine. It has now also been found that the polymers formulated at the beginning are also obtained if a N,N'-bis-halogenosilyl)-diazasilacycloalkane of the general formula (D) 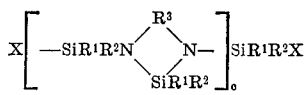

in which $R^1$, $R^2$, $R^3$ and $n$ are defined as above and X signifies a chlorine atom or bromine atom, is brought to reaction with an alkali salt of hydroxy compound (C) in a manner which is known per se. These halogeno compounds are described in detail in copending application Ser. No. 563,693, filed July 8, 1966.

The 1,3-bis-(chlorosilyl)-1,3-diaza-2-sila-cycloalkanes (D) serving as starting products in the present process and containing at their chain ends each a chlorine atom, are suitably obtained on reacting a diamine with, e.g., a diorganodichlorosilane or cycloorganodichlorosilane, respectively in a manner which is known per se. The corresponding dimeric and oligomeric starting products (D) with $c=2$–10 are obtained in the desired composition if a diamine and, e.g., a dichlorosilane are reacted first in a molar proportion of 1:0.5 in an inert solvent at a temperature lying below about 25° C. the reaction mixture is then heated at a temperature lying at about 60 to 130° C. for about 10 minutes; thereafter, the theoretically necessary quantity of diorganodihalogenosilane, which is still missing to obtain the desired grade of polymerization, is added at once to the cooled solution which is heated in order to finish the reaction.

The exchange of halogen and amine which leads to the starting products (B) is realized best with secondary amines. It is desirable that these amines possess a lower boiling point than the hydroxy compounds to be reacted.

Preferably, one utilizes a secondary amine, e.g., diethylamine, because side reaction can easily occur in the preparation of the starting products (B) with ammonia or primary amines.

In order to effect the exchange of halogen and amine, it is sufficient to react the dihalogenosilane (D) with the calculated quantity of amine, suitably on heating in an inert solvent, e.g., hexane or octane. An excess quantity of the amine to be reacted or a tertiary amine can be used as acid-binding agents. It is also possible to combine this reaction with the reaction of invention, i.e., it is not necessary to isolate the intermediate product.

Examples of the groups $R^1$ and $R^2$ attached to the silicon atoms are fluorine atoms, alkyls, alkenyls and alkynyls such as methyl, ethyl, vinyl, ethynyl, n-propyl, iso-propyl, allyl, propenyl, propargyl, propynyl, n-butyl, iso-butyl, sec-butyl, tert-butyl, methallyl, 1-butenyl, crotyl, butadienyl, 1-butynyl, 2-butynyl, 1-buten-2-ynyl and higher aliphatic groups having up to 24 carbon atoms such as undecenyl, dodecyl, myristyl, oleyl and tetracosyl; moreover, cycloalkyls, cycloalkenyls and cycloalkynyls such as cyclobutyl, cyclopentyl, cyclopentenyl, cyclopentadienyl, cyclohexyl, cyclohexenyl, cyclohexadienyl, cyclohexynyl and greater alicyclic groups having up to 12 carbon atoms such as cyclooctyl, cyclododecyl, cyclooctatrienyl, cyclododecatrienyl and bicyclohexyl; moreover aralkyls, aralkenyls and aralkynyls such as benzyl, cuminyl, phenylethyl, styryl, phenylethynyl, phenylpropyl, 3-phenylallyl, 2-phenylallyl, 1-phenylallyl, cinnamyl, 1-phenylpropyl, 1-phenylpropargyl, diphenylmethyl, triphenylmethyl, α-naphthylmethyl, β-naphthylmethyl, 1-(α-naphthyl)ethyl, 2-(α-naphthyl)ethyl, 1-(β-naphthyl)ethenyl, 2-(β-naphthyl)ethyl, 1-(α-naphthyl)ethenyl, 2-(α-naphthyl)ethenyl, 1-(β-naphthyl)ethenyl, 2-(β-naphthyl)ethenyl, α-naphthylenethynyl and β-napthylethynyl; moreover alkaryls, alkenylaryls and alkynylaryls such as tolyl, xylyl, mesityl, duryl, ethylphenyl, cumyl, vinylphenyl, ethynylphenyl, propargylphenyl, propynylphenyl, tert-butylphenyl, α-vinylnaphthyl, β-vinylnaphthyl, α-ethynylnaphthyl and β-ethynylnaphthyl; moreover aryls such as phenyl, o-biphenylyl, m-biphenylyl, p-biphenylyl, m-terphenylyl, p-terphenylyl, 1-naphthyl, 2-naphthyl, 2-anthryl, 9-anthryl, 1-phenanthryl, 2-phenanthryl, 3-phenanthryl, 4-phenanthryl, 9-phenanthryl, indanyl and indenyl; moreover heterocyclic groups such as pyrryl, furyl, tetrahydrofuryl, benzofuryl, tienyl, pyrrolinyl, pyrolidyl, pyrazolyl, pyrazolinyl, pyrazolidyl, imidazolidyl, benzimidazolyl, thiazolyl, oxazolyl, iso-oxazolyl, triazolyl, pyrazinyl, pyrimidyl, pyridazinyl, pyridyl, pyranyl, thiopyranyl, piperidyl, morpholinyl, thiazinyl, triazinyl, quinolyl, quinazolyl, indolyl, phenazinyl, carbazolyl, etc. These organic groups can be attached to their silicon atom also through an oxygen atom.

The simplest representatives of starting compounds in the process of invention are, e.g., 1,3-bis-(diethylamino-dimethylsilyl)-2,2-dimethyl-1,3,2 - diazasilacyclopentane, 1,3-bis-(diethylamino-diphenylsilyl) - 2,2 - diphenyl-1,3,2-diazasilocyclopentane and 1,3-bis-[1-diethylamino-silacyclopentyl-(1)]-1,3,2-diazasilaspiro [4,4] nonane. In the last mentioned compound $R^1$ and $R^2$ are members of a heterocyclic group, i.e., they form together with their silicon atom a silacycloalkyl group. Silacyclobutyl, silacyclopentyl, silacyclohexyl, silacyclohexenyl, silacyclohexanienyl, silacycloheptyl, silacycloheptenyl, silacycloheptadienyl and silacycloheptatrienyl are further examples of such groups.

Analogous compounds may show other groups or a combination of organic groups such as enumerated above instead of, e.g., methyl. Moreover, the compounds may show a combination of organic groups and fluorine atoms as, e.g., in the compound 1,3-bis-(diethylamino-fluoro-phenylsilyl)-2,2 - dimethyl - 1,3,2 - diazasilacyclopentene.

It has been found that the enumerated hydrocarbon groups and heterocyclic groups can also show substituents which do not hinder the reaction of invention, i.e., the exchange of the amino groups or halogen atoms, respectively, for the groups derived from a dihydric or polyhydric alcohol, phenol or silanol.

Examples of such substituents are Cl, Br, I, F, —OR″, —SR″, —SiR*$_3$, —SIR*$_2$SiR*$_3$, —SiR*$_2$OSiR*$_3$, —BR*$_2$, —P(O)R*$_2$, —P(S)R*$_2$, —CN and —NO$_2$ (R″ and R* are defined as before).

Examples of some halogenated hydrocarbyl groups are: chloromethyl, dichloromethyl, trichloromethyl, bromomethyl, dibromomethyl, tribromomethyl, fluoromethyl, difluoromethyl, trifluoromethyl, 1-chloroethyl, 2-chloroethyl, 1-bromoethyl, 2-bromoethyl, 1-fluoroethyl, 2-fluoroethyl, 1,2-dichloroethyl, 1,2-difluoroethyl, 2-trichloroethyl, 2-trifluoroethyl, pentafluoroethyl, 2-chlorovinyl, 1-chlorovinyl, 1,2-dichlorovinyl, trichlorovinyl, trifluorovinyl, bromophenyl, fluorophenyl, difluorophenyl, trifluorophenyl, pentafluorophenyl, trichloromethylphenyl and bis(trifluoromethyl)phenyl. Other hydrocarbyl groups and also heterocyclic groups of the enumerated ones can similarly be halogenated.

Examples of R″O substituents are: methoxy, ethoxy, vinyloxy, n-propoxy, iso-propoxy, 1-propenoxy, 2-propenoxy, iso-propenoxy, n-butoxy, iso-butoxy, sec-butoxy, tert-butoxy, crotoxy, n-amoxy, iso-amoxy, n-octoxy, 10-undecylenoxy, lauroxy, stearoxy, phenylmethoxy, styryloxy, phenylethynyloxy, o-, p- and m-allylphenoxy, phenoxy, toloxy, xyloxy, 3-biphenylyloxy, 2-biphenylyloxy, 4-biphenylyloxy, 1-naphthoxy, 2-naphthoxy and asaroxy. The corresponding thio analogues contain sulfur instead of oxygen. Moreover, substituents arising from the polymerization of formaldehyde and obeying to the formula TOCH$_2$(OCH$_2$)$_e$O—, from the addition of ethylene oxide or propylene oxide, respectively, and subsequent etherification of the terminal HO group corresponding to the formulae TOCH$_2$CH$_2$(OCH$_2$CH$_2$)$_e$O— and $$TOCH_2CH_2CH_2(OCH_2CH_2CH_2)_eO—$$

(T is a terminal blocking group, as usual in such groups; $e$=integer 1–10). Further substituents contain some branched ether groupings such as veratroxy, anisoxy, phenetoxy, 3,4-dimethoxyphenoxy, 3-phenoxy-4-methoxyphenyloxy and wholly aromatic analogues as will be enumerated later for the group $R^4$. According to the definition given for $R^1$ and $R^2$, these groups can be attached also directly to the silicon atoms.

Examples of some simple representatives of the great class of cyanated and nitrated hydrocarbyl groups are: 2-cyanoethyl, 2-nitroethyl, 2-cyano-n-propyl, 3-cyano-n-propyl, 2,4-dicyano-n-butyl. Other hydrocarbon groups such as enumerated before for $R^1$ and $R^2$ can be found instead of ethyl, n-propyl and n-butyl.

Examples of some silyl substituents of the general formula —SiR*$_3$, which may be more closely defined by the general formula —SiR″$_3$, are: trimethylsilyl, tris-(trifluoromethyl)-silyl and other possibly substituted trihydrocarbylsilyls containing alike or different saturated or unsaturated alkyls, cycloalkyls, aralkyls or aryls, as they have been cited for $R^1$ and $R^2$ before, including silyl groups in which Si is a constituent of a heterocyclic ring like in the groups silacyclopentyl, silacyclopentenyl, silacyclohexyl, silacyclohexenyl, silacyclohexadienyl and the like or which may be more closely defined by the general formulae —SiF$_3$, —SiF$_2$R″ and —SiF(R″)$_2$, are: trifluorosilyl, methyldifluorosilyl, dimethylfluorosilyl, phenyldifluorosilyl, diphenylfluorosilyl and other hydrocarbyl-difluorosilyl groups or bis-(hydrocarbyl)-fluorosilyl groups containing the above mentioned hydrocarbyl groups; or which may be more closely defined by the general formulae —Si(OR″)$_3$, —SiF$_2$OR″ and $$—SiF(OR″)_2$$

are: trimethoxysilyl, difluoro-methoxysilyl, dimethoxyfluorosilyl, triphenoxysilyl, phenoxydifluorosilyl, diphenoxyfluorosilyl and other tris-(hydrocarbyloxy)-silyls, bis- (hydrocarbyloxy) - fluorosilyls and hydrocarbyloxydifluorosilyls containing alike or different saturated or unsaturated alkoxyls, cycloalkoxyls, aralkoxyls, alkaroxyls or aroxyls, as they have been cited for —OR″; or finally, which may be more closely defined by the general formulae —Si(OR″)₂R″ and —Si(OR″)R″₂, are: methyl-dimethoxysilyl, dimethyl-methoxysilyl and analogues possessing a combination of other organic groups such as have been enumerated before.

The silyl groups can be attached through oxygen and consequently correspond to the general formula —OSiR*₃

Some simple representatives are trifluorosiloxy, trimethylsiloxy, trimethoxysiloxy, triphenylsiloxy, triphenoxysiloxy, dimethylmethoxysiloxy, methyl-dimethoxysiloxy, phenyl-diphenoxysiloxy, diphenyl-phenoxysiloxy, dimethyl-phenoxysiloxy, phenyl-dimethoxysiloxy and analogues possessing a combination of other organic groups such as have been enumerated before.

The simplest representatives of the substituents showing Si—Si— or Si—O—Si bonds are pentamethyldisilanyl, 1-trimethylsilyl-tetramethyldisilanyl, 1-bis-(trimethylsilyl)-trimethyldisilanyl, pentamethoxydisilanyl, pentamethoxydisiloxanyl, 1-trimethoxysilyl - tetramethoxydisiloxanyl and 1-bis-(trimethoxysilyl)-trimethoxydisiloxanyl. Analogous substituents may contain other organic groups such as have been enumerated for R¹ and R², or fluorine atoms, instead of methyl.

According to the definition of R¹ and R² set forth at the beginning, these silyl groups can be attached also directly to the silicon atoms of the disilyl-diazasilacycloalkane unit.

In order to prepare linear and non cross-linked end products (A), the monomeric to oligomeric bis-(aminosilyl)-diazasilacycloalkanes (B) or bis-(chlorosilyl)-diazasilacycloalkanes (D) can be brought to reaction with diol (C) or dialkali salt of a diol, respectively.

Organic groups should be considered for R⁴ which are derived from saturated or unsaturated hydrocarbons as have been enumerated above for monovalent groups R¹ and R². The hydroxyls can be adjacent or more distant from each other in an aliphatic chain like, e.g., in the compounds ethylene glycol and 1,12-dodecane diol. The hydroxyls can be present also in chain branches like, e.g., in the compounds 4,4-bis-(hydroxymethyl)-heptane, 5-hydroxy-4-hydroxymethylnonane and 2,4-diphenyl-6,6-bis-(hydroxymethyl)-octane. In cyclic diols, the hydroxyls can be situated in ortho, meta or para position to each other like, e.g., in pyrocatechin, resorcin and hydroquinone.

The compounds containing the hydroxyls in peri-position like, e.g., 1,8-dihydroxynaphthalene, 1,8-dihydroxydecalin, 1,9-dihydroxyanthracene, 4,5-dihydroxyquinoline and 1,9-dihydroxycarbazole are also suitable. Moreover, the hydroxyls can be found simultaneously on a ring and on an aliphatic chain like, e.g., in the compounds ortho, meta and para hydroxybenzylalcohol, ortho, meta and para β-hydroxyethylcyclohexanol and ortho, meta and para γ-hydroxypropylphenol.

In order to prepare cross-linked end products (A), there can be employed hydroxy compounds (C) which contain three or more hydroxy groups. Examples of some simple representatives are: glycerin, 1,1,1-tris-(hydroxymethyl)-ethane, erythrite, tetrahydroxyneopentane, pentaerythrite, sorbite, pyrogallol, hydroxyhydroquinone, phloroglucin, dihydroxybenzylalcohol, 1,2,3-, 1,2,4- and 1,3,5 - trihydroxycyclohexane, trihydroxynaphthalenes, tetrahydroxynaphthalenes, trihydroxy-1,3,5-triazine and tetrahydroxyquinoxaline.

By using simultaneously monovalent and multivalent alcohols, phenols or silanols there can be obtained polymers being more or less cross-linked.

Examples of dihydroxysilanes are diphenyl-dihydroxysilane, 1,3-dihydroxy-tetraphenyldisiloxane and 1,3-bis-(dimethyl-hydroxysilyl)-tetramethylcyclodisilazane.

Whereas, the choice of substituents occurring in the groups R¹ and R² will suffer some limitation due to difficulties in the preparation of the starting compound (B), much more substituents can be introduced with the hydroxy compounds.

The following substituents have to be considered besides those already mentioned for R⁴: —COR″, —CSR″, —COOR′, —OCOR″, —COSR′, —CSOR′, —CSSR′, —CONR′₂,—N(R′)COR″,—N(R′)COOR′ —N(R′)CONR′₂, —NR′₂, —N=NR″, =NR′ —N=NCR″₂, —SOR″, —SO₂R″, —SO₂OR′ —SO₂NR′₂, —N(R′)SO₂R″ and —N(R′)SO₂OR″

(R′ and R″ are defined as before).

Examples of some acyl substituents showing the general formula —COR″ are: acetyl, n-propionyl, iso-propionyl, acrylyl, crotonyl, propiolyl, n-butyryl, iso-butyryl, valeryl, pivalyl, enanthyl, caprylyl, lauroyl, myristoyl, oleoyl, stearoyl, phenylacetyl diphenylacetyl, cinnamoyl, benzoyl, naphthoyl, cumoyl, 4-biphenylylcarbonyl, anisoyl, phenetoyl, veratroyl, 2,3,4- 1,4,5- and 3,4,5-trimethoxybenzoyl, p-diphenylaminobenzoyl, cyanoacetyl, trimethylsilylanthranoyl, methoxyacetyl, dimethylaminoaceyl, trimethylsilylaminoacetyl, bis(triphenylsilyl)aminoacetyl, trimethylsiloxyacetyl, trichloroacetyl, trifluoroacetyl, 2-furoyl, 3-furoyl, pyrroyl, including the thio analogues which correspond to the general formula —CSR″.

Examples of sulfinyl and sulfonyl substituents are those groups which contain a —SO— or —SO₂— group in the place of the —CO— group shown in the formula above and consequently correspond to the general formulae —SOR″ and —SO₂R″. These groups can occur in the hydrocarbyl groups several times, as well as the carbonyl groups.

Examples of some ester substituents showing the general formula —COOR′ are: carbomethoxy, carbethoxy, carbovinyloxy, carbo-n-propoxy, carbo - 2 - propenoxy, carbo-iso-propenoxy, carboctoxy, carbundecylenoxy, carboctadecoxy, carbophenoxy, including the thio analogues which correspond to the general formulae —COSR′, —CSOR′ and —CSSR′. The free acid groups can be obtained, e.g., by hydrolysis, preferably in an alkaline medium.

Examples of parent sulfonic ester substituents are those groups which possess a —SO₂— group in the place of the —CO— group shown in the formula above and which therefore correspond to the general formula —SO₂OR′.

The enumerated carboxylic ester groups and sulfonic ester groups can be attached also through a nitrogen atom and thus represent in the first case a urethane group corresponding to the general formula —N(R″)COOR″ including the analogous groups of thiourethanes. In the second case they represent a sulfonamide group and therefore can be expressed by the general formula

—N(R′)SO₂OR′

The sulfonic acid group can be restored by hydrolysis, preferably by alkaline hydrolysis. Examples of a further class of ester substituents conforming with the general formula —OCOR″ are: acetoxy, acrylyloxy, n-propionyloxy, crotonyloxy, propiolyloxy, tetrolyloxy, n-butyryloxy, valeryloxy, caproyloxy, caprylyloxy, pelargonyloxy, phenylacrylyloxy, benzoxy, capryloxy, lauroyloxy, palmitoyloxy, cumoyloxy, phenlacetoxy, including the thio analogues showing the general formulae —SCOR″, —OCSR″ and —SCSR″.

The esters of dicarboxylic acids, e.g., the ethyl ester of oxalic acid, malonic acid, succinic acid, maleic acid, fumaric acid, adipic acid, phthalic acid, etc., as well as the free acid groups, can also be present as substituents.

Examples of a further class of ester substituents are those groups which possess a —$SO_2$— group in the place of the —CO— group shown in the formula above and consequently correspond to the general formula $$-OSO_2R''$$

Examples of some carbamyl substituents showing the general formula —$CONR'_2$ are: the unsubstituted carbamyl group and the organically substituted carbamyl groups like methylcarbamyl, ethylcarbamyl, allylcarbamyl, n-propylcarbamyl, iso-propylcarbamyl, iso-propenylcarbamyl, n-butylcarbamyl, sec-butylcarbamyl, 3-n-butenylcarbamyl, myristylcarbamyl, cyclohexylcarbamyl, phenylcarbamyl, trimethylsilylcarbamyl, dimethyl-phenylsilylcarbamyl, triphenylsilylcarbamyl including the di-substituted carbamyl groups.

Examples of some tertiary amino groups are: dimethylamino, diethylamino, di-n-propylamino, di-iso-propylamino, diallylamino, di-n-butylamino, di-iso-butylamino, di-tert-butylamino, di-3-butenylamino, di-2-butenylamino, di-n-amylamino, di-iso-octylamino, didodecylamino, dicyclohexylamino, dicyclohexenylamino, dibenzylamino, diphenylamino, ditolylamino, bis(biphenylyl)amino, bis(p - methoxyphenyl)amino, bis(m - phenoxyphenyl)amino, bis(m-trifluoromethylphenyl)amino, N,N,N'-triphenylbenzidino, pyrrolino, pyrrolidino, pyrazolino, piperidino, morpholino, thiazino, N-trimethylsilylpiperazino, tetrahydroquinolino, decahydroquinolino.

Examples of some amido substituents showing the general formula —N(R')COR" are: acetamido, chloroacetamido, trifluoroacetamido, benzamido, cyanobenzamido (iso - propionylamido, n - butyrylamido, valerylamido, palmitoylamido, tetracosanoylamido, naphthoylamido, including the parent imido substituents like phthalimido and pyromellitimido.

Examples of sulfonamido substituents are these groups which contain a —$SO_2$— group in the place of the —CO— group shown in the formula above and which therefore correspond to the general formula $$-N(R')SO_2R''$$

Examples of some azo substitutents possessing the general formula —N=NR" are: methylazo, ethylazo, n-butylazo, iso-butylazo, tert-butylazo, phenylazo, N-phenylphenylene-bis-azo.

Examples of some azino substituents possessing the general formula =N—N=CR"R" are: acetaldehydazino, acetonazino, hexafluoroacetonazino, benzaldehydazino, acetophenonazino, 2,4'-dichloroacetophenonazino, benzophenonazino, 4,4'-bis-(N-trimethylsilyl - methylamino)-benzophenonazino.

Examples of some alkylidenamino substituents possessing the general formula —N=CR"R" are: methylenamino, ethylidenamino, 2-trifluoroethylidenamino, vinylidenamino, n-propylidenamino, 1-ethylbutylidenamino, 3-butenylidenamino, benzylidenamino, α-methylbenzylidenamino, α-phenylbenzylidenamino, cinnamylidenamino.

Examples of some imino substituents possessing the general formula =NR' are: the free imino group and the organically substituted imino groups like methylimino, iso-butylimino, sec-butylimino, allylimino, cycloheptylimino, phenylethylimino, anisylimino, p-dimethylaminophenylenimino, pentafluorophenylimino.

The silyl groups, disilyl groups and disiloxanyl groups which have been enumerated above can be attached also through a nitrogen atom to the group $R^4$. Some simple representatives are: trifluorosilylamino, trifluorosilylmethylamino, bis-(trimethylsilyl)-amino, trimethoxysilylamino, trimethoxysilyl-methylamino, bis-(trimethoxysilyl)-amino, triphenylsilylamino, methyl-diphenylsilylamino, bis-(dimethyl-phenylsilyl)-amino, pentamethyldisilanylamino, pentamethyldisilazanylamino, pentamethyldisiloxanylamino, pentamethoxydisilanylamino, pentamethoxydisilazanylamino and pentamethoxydisiloxanylamino.

In general, all the cited substituents are attached to lower alkyls, alkenyls or alkynyls having 1 to 5 carbon atoms or to phenyl. However, they can occur also on higher aliphatic groups or on cycloaliphatic, araliphatic or polynuclear aromatic groups. It may be pointed out that the cited substituents in the alicyclic and aromatic groups can be attached with respect to the ring-connecting link, as well as with respect to each other if several substituents are present, in ortho, meta or para position.

The group $R^4$ can represent also a hydrocarbon chain which is interrupted by heteroatoms or heteroatom groups like O, S, CO, SO and $SO_2$.

Examples are 2,2'-dihydroxydiethylether, 3,3'-dihydroxyperfluorobicyclohexyloxide, 2,2'-dihydroxydiethylsulfide, 2,2'-, 3,3'- and 4,4'-dihydroxydiphenylsulfide, 1,3-dihydroxyacetone, 2,2'-, 3,3'- and 4,4'-dihydroxybenzophenone, 3,3'-dihydroxydicyclohexylsulfoxide, 2,2'-, 3,3'- and 4,4'-dihydroxydiphenylsulfoxide, 2,2'-dihydroxydiethylsulfone, 2,2'-, 3,3'- and 4,4'- dihydroxydiphenylsulfone.

Especially valuable products being distinguished by their great thermal and hydrolytic stability and displaying good thermoplasticity are obtained when the silicon atoms linking the cyclodisilazane rings are connected through a diaryl ether grouping ArOAr. Examples are the divalent groups derived from the following compounds: phenoxybenzene, toloxybenzene, 2-biphenylylether, 3-biphenylylether, 4-biphenylylether, 2-biphenylyl-4-biphenylylether, 3 - biphenylyl-4-biphenylylether, 1-(2-biphenylyloxy)-4-phenoxybenzene, 1-(3-biphenylyloxy)-2-phenoxybenzene, 1-(3-biphenylyloxy)-3-phenoxybenzene, 1-(3-biphenylyloxy)-4-phenoxybenzene, 1-(4-biphenylyloxy)-2-phenoxybenzene, 1-(4-biphenylyloxy)-3-phenoxybenzene, 1-(4-biphenylyloxy) - 4 - phenoxybenzene, 2,2' - diphenoxybiphenyl, 3,3'-diphenoxybiphenyl, 4,4'-diphenoxybiphenyl, 2,3'-diphenoxybiphenyl, 2,4'-diphenoxybiphenyl, 3,4'-diphenoxybiphenyl, 2,4-diphenoxybiphenyl, 2,5-diphenoxybiphenyl, 2,6-diphenoxybiphenyl, 3,4-diphenoxybiphenyl, 3,5-diphenoxybiphenyl, 1,2,3-triphenoxybenzene, 1,2,4-triphenoxybenzene, 1,3,5-triphenoxybenzene, 2-phenoxyphenylether, 3 - phenoxyphenylether, 4 - phenoxyphenylether, 2-phenoxyphenyl-3-phenoxyphenylether, 2-phenoxy-4'-phenoxyphenylether, 3-phenoxyphenyl - 4' - phenoxyphenylether, 1-phenoxynaphthalene, 2-phenoxynaphthalene, 1,1'-dinaphthalenether, 2,2'-dinaphthalenether, 1,2'-dinaphthalenether, etc., moreover, longer chain polyaroxyaryls ArO$(ArO)_e$Ar (Ar=possibly low alkyl-substituted phenyl, biphenyl, or naphthyl; e is defined as before). The aroxy groups may be in the ortho, para or meta position with respect to the oxygen atoms of the diols. Moreover, in the enumerated aryls one or more hydrogen atoms may have been replaced by fluorine atoms, thereby the thermoplasticity of the end products will be increased. When in the end products, ether groupings are present, the stability against oxidation may be increased by addition of a well-known agent acting as a catalase.

In this invention are included also the corresponding thio ether derivatives containing sulfur instead of oxygen.

Further valuable polymers have the recurring N,N'-disilyl-diazasilacycloalkane units directly linked by an oxygen atom, i.e., the linking group —$OR^4O$— is replaced by —O—. These polymers are obtained when the starting hydroxy compound (C) is a N,N'-bis-(hydroxydiorganosilyl)-diazasilacycloalkane or N,N'-bis-[1-hydroxysilacycloalkyl-(1)]-diazasilacycloalkane.

On practically carrying out the process of invention according to the amine exchange method, a starting compound (B) and a hydroxy compound (C) are mixed in suitable portion and heated until no more essential quantity of amine evolves from the reaction mixture. When ammonia or an easily volatile amine, e.g., diethylamine is split off, the reaction proceeds rather fast, at about 50 to 150° C. In order to afford higher polymeric end products, the reaction is generally carried out in an inert solvent.

On carrying out the reaction according to the chlorine exchange process, the starting compound (D) and an alkali salt of hydroxy compound (C) are heated in an inert solvent until the separation of alkali chloride is finished.

Suitable solvents are, e.g., straight-chain or branched-chain paraffins having about 6 to 12 carbon atoms such as n-hexane, n-nonane, n-decane, n-undecane and n-dodecane; cycloparaffins such as cyclohexane, methylcyclohexane, cyclohexene, cycloheptane and cyclooctane; aromatic hydrocarbons such as benzene, toluene, xylene, ethylbenzene, mono- and dialkylnaphthalenes, like 1-methylnaphthalene, 1,4 - dimethylnaphthalene, 1 - ethylnaphthalene, 2 - ethylnaphthalene; hydroaromatic hydrocarbons such as tetralin, Decalin, etc.; moreover, chlorinated and fluorinated derivatives of the hydrocarbons enumerated above; moreover, aliphatic ethers such as methyl - ethylether, ethylether, isopropylether, n - propylether, allylether, ethyl - n - butylether, n - butylether, is o - butylether, benzyl - methylether, ethyleneglycoldimethylether, ethyleneglycoldiethylether, diethyleneglycoldimethylether, etc.; aromatic ether like anisole, phenetole, veratrole, phenylether, phenylallylether, phenyl - benzylether, etc.; cyclic ether like furan, tetrahydrofuran, tetrahydrofurfuryl - ethylether, dioxane, etc. Moreover, some qualified solvents are acetonitrile, benzonitrile, acetone, diethylketone, dimethylsulfone, dimethylsulfoxide, tetramethylenesulfoxide, diethylsulfone, dimethylformamide, dimethylacetamide, ethylacetate, N - ethylmorpholine, pyridine, N,N' - dialkylpiperazines and tetramethylurea. The choice of the appropriate solvent is directed by the solubility of the reactants. Moreover, it can be desirable that the formed polymer separates as soon as possible from the solvent or such a separation may be undesired. The condensation can be finished in the solvent or be finished only after elimination of the solvent. Moreover, one can work also without a solvent. The molecular weight of the polymers can be affected in usual manner by addition of chain-terminating agents. Monohydric alcohols or phenols are especially suited. A cross-linking is best achieved by trihydric or polyhydric alcohols or phenols.

The polymers are liquid, waxy, glassy, glutinous or rubber-like according to the radical $R^1$, $R^2$, $R^3$ and $R^4$. If they contain carboxylic, sulfo or other sufficiently acid groups they can be soluble in water in the form of their alkali salts and become insoluble on acidifying.

They can be more or less cross-linked and insoluble in any usual organic solvent. They are resistant at temperatures up to 450° C. and more and may be still useful at temperatures up to even 1000° C. where sometimes they lose only a part of their organic constituents. Many of the polymers can be processed by the usual thermoplastic methods, such as extrusion, injection molding and blown, calendered and extruded films and some other by conventional rubber molding techniques such as compression and transfer mold. The hard types of the polymers of invention are casting resins which are workable by using cutting machines, or the polymerization is carried out during the fabrication. The foamed polymers can be prepared in known manner by addition of blowing agents like azo-bis-isobutyronitrile, dinitrosohexamethylenetetramine and the like.

A further object of this invention is the use of the polymeric cyclodisilazanes in the preparation of coatings, films, impregnations and the like. For this purpose, the mixture of the starting components (B+C) is applied to a substratum and subjected to such temperatures as the formation of higher polymerized, possibly cross-linked synthetic composition coatings is achieved. Or, the readily prepared polymer is applied in a solvent such as hexane, benzene, tetrahydrofuran, acetone, ether, methanol, ethanol, ethylacetate, amylacetate and the like. After evaporation of the solvent, the polymer can be baked on its support. The polymers are excellently suited for lacquers and impregnations of substrates such as paper, textiles, leather, plastics, wood, glass, metals, rubber and the like. The polymers can contain as additives other constituents such as powdered wood, asbestos, glass fibers, metal fibers, pigments, etc., whereby their mechanical properties will be modified.

A further application of the novel polymers comprises heating said polymers at a vary high temperature, e.g., 300° to 500° C., whereby a pyrolytic cross-linking to high temperature resistant masses occurs. This cross-linking can be carried out also on a substratum, e.g., glass fibers, metal foils and the like, whereby a good adhesion to the substratum, or cementing of the substrata respectively, will be achieved.

Example 1

A solution of 8.24 g. (0.022 mole) of 1,3 - bis - (diethylamino - dimethylsilyl) - 2,2 - dimethyl - 1,3,2-diazasilacyclopentane and 4.1 g. (0.022 mole) of 4,4'-dihydroxybiphenyl in 30 ml. of dimethoxyethane is refluxed. The cleaved diethylamine is continuously distilled off through a column maintained at 60° C. The quantity of diethylamine recovered within 45 to 60 minutes is 95.5% of theory. The solvent is distilled off at 50 to 60° C. under reduced pressure and the remaining polymer is dried at 100° C. in the vacuum for 8 hours.

Yield 8.66 g. (95.1%) of slightly brown, waxy substance.

*Analysis.*—$C_{20}H_{30}N_2O_2Si_3$: Calc'd: C, 57.92%; H, 7.29%; N, 6.75%. Found: C, 57.49%; H, 7.40%; N, 6.27%.

EXAMPLE 2

A solution of 7.49 g. (0.020 mole) of 1,3-bis-(diethylamino - dimethylsilyl) - 2,2-dimethyl-1,3,2-diazasilacyclopentane and 4.56 g. (0.020 mole) of bis-(4-hydroxyphenyl)-dimethylmethane [Bisphenol A] in 80 ml. of dimethoxyethane is refluxed and worked up as in Example 1. The quantity of diethylamine recovered within 24 hours is 96.7% of theory.

Yield 8.7 g. (94.8%) of yellow, waxy substance which is slowly flowing at room temperature.

*Analysis.*—$C_{23}H_{38}O_2N_2Si_3$: Calc'd: C, 60.21%; H, 8.35%; N, 6.11%. Found: C, 60.28%; H, 7.76%; N, 5.83%.

EXAMPLE 3

A solution of 5.47 g. (0.010 mole) of bis-[3-diethylamino - dimethylsilyl - 2,2,-dimethyl-1,3,2-diazasilacyclopentyl-(1)]-dimethylsilane; B.P. 180° C./0.03 mm., $n_D^{20}$ 1.4748; and 1.86 g. (0.010 mole) of 4,4' - dihydroxybiphenyl in 30 ml. of dimethoxyethane is refluxed and worked up as in Example 1. The quantity of diethylamine recovered within 3 days is 95% of theory (within 16 hours 92.9% of theory).

Yield 5.4 g. (91.8%) of white, waxy substance.

*Analysis.*—$C_{26}H_{46}O_2N_4Si_5$: Calc'd: C, 53.19%; H, 7.90%; N, 9.54%. Found: C, 51.23%; H, 7.78%; N, 9.13%.

The condensation can lead to still higher molecular polymers upon longer or stronger heating of the solution.

The polymers of Examples 4 to 12 are prepared in the following manner:

A solution of 0.025 mole of the starting compound in 50 to 70 ml. of xylene and 0.025 mole of the bisphenol or disilanol in 50 to 70 ml. of xylene is reflected. The amine or ammonia formed is distilled in a stream of nitrogen through a column kept at 65° C. into a receiving vessel containing 1 N HCl (50 ml. HCl is equivalent to a complete reaction) and continuously titrated. The reaction time, in order to achieve 98 to 99% replacement varies for the methyl derivatives from 1 to 5 hours and for the phenyl derivatives up to 40 hours. The polymers even at high conversion (98–99%) remain in solution.

The polymers are dried in vacuum at 90 to 100° C. to constant weight. If necessary, they are further purified by precipitation from xylene or benzene using hexane. The thermal and hydrolytic resistance is shown in the tables.

EXAMPLE 4

From N,N' - bis - [3-diethylamino - dimethylsilyl - 2,2-dimethyl - 1,3,2 - diazasilacyclopentyl-(1)-dimethylsilyl]-2',2' - dimethyl - 1',3',2' - diazasilacyclopentane and 4,4'-dihydroxybiphenyl, a yellowish polymer is obtained which is glutinous and more plastic than the polymer of Example 3 (where c=2).

Analysis.—$C_{32}H_{62}O_2N_6Si_7$: Calc'd: C, 50.60%; H, 8.23%; N, 11.07%. Found: C, 49.60%; H, 7.92%; N, 10.84%.

EXAMPLE 5

From bis - {3' - [3 - diethylamino - dimethylsilyl - 2,2-dimethyl - 1,3,2 - diazasilacyclopentyl - (1)]-3'-dimethyl-silyl - 2',2' - dimethyl - 1',3',2'-diazasilacyclopentyl-(1)}-dimethylsilane and 4,4'-dihydroxybiphenyl, a yellowish polymer is obtained which is glutinous and more plastic than the polymer of Example 4 (where c=3).

Analysis.—$C_{38}H_{78}O_2N_8Si_9$: Calc'd: C, 48.98%; H, 8.44%; N, 12.03%. Found: C, 48.13%; H, 8.16%; N, 11.73%.

EXAMPLE 6

From 1,3 - bis - (diethylamino - dimethylsilyl)-2,2-dimethyl-1,3,2-diazasilacyclopentane and hydroquinone, a white to yellow polymer is obtained which is glutinous, plastic and shows somewhat more elasticity than the polymer of Example 1.

Analysis.—$C_{14}H_{26}O_2N_2Si_3$: Calc'd: C, 49.65%; H, 7.74%; N, 8.27%. Found: C, 49.58%; H, 7.63%; N, 9.01%.

EXAMPLE 7

From 1,3 - bis - (diethylamino - dimethylsilyl) - 2,2-dimethyl - 1,3,2 - diazasilacyclopentane and 1,4 - bis-(hydroxy-diphenylsilyl)-benzene, a white to yellow polymer is obtained which is a hard, slightly plastic mass becoming easily mouldable at, e.g., 35° C.

Analysis.—$C_{38}H_{46}O_2N_2Si_5$: Calc'd: C, 64.90%; H, 6.59%; N, 3.98%. Found: C, 65.21%; H, 6.48%; N, 3.92%.

EXAMPLE 8

From 1,3 - bis - (n - propylamino - diphenylsilyl)-2,2-diphenyl-1,3,2-diazasilacyclopentane and hydroquinone, a white to yellow polymer is obtained which is hard, brittle mass.

Analysis.—$C_{44}H_{38}O_2N_2Si_3$: Calc'd: C, 74.32%; H, 5.39%; N, 3.94%. Found: C, 72.98%; H, 5.28%; N, 3.86%.

EXAMPLE 9

From 1,3 - bis - (n - propylamino - diphenylsilyl)-2,2-diphenyl-1,3,2-diazasilacyclopentane and 4,4'-dihydroxybiphenyl, a white to yellow polymer is obtained which is a hard, brittle mass.

Analysis.—$C_{50}H_{42}O_2N_2Si_3$: Calc'd: C, 76.29%; H, 5.38%; N, 3.56%. Found: C, 75.83%; H, 5.28%; N, 4.06%.

EXAMPLE 10

From 1,3 - bis - (n - propylamino - diphenylsilyl)-2,2-diphenyl-1,3,2-diazasilacyclopentane and bis-(4-hydroxyphenyl)-dimethylmethane is obtained a white to yellow polymer which is a hard, brittle mass.

Analysis.—$C_{53}H_{48}O_2N_2Si_3$: Calc'd: C, 76.76%; H, 5.83%; N, 3.38%. Found: C, 76.83%; H, 5.78%; N, 3.41%.

EXAMPLE 11

From 1,3 - bis - (n - propylamino - diphenylsilyl)-2,2-diphenyl - 1,3,2 - diazasilacyclopentane and 1,4 - bis-(hydroxy-diphenylsilyl)-benzene is obtained a white to yellow polymer which is hard, brittle mass.

Analysis.—$C_{66}H_{58}O_2N_2Si_5$: Calc'd: C, 75.38%; H, 5.56%; N, 2.66%. Found: C, 75.48%; H, 5.10%; N, 2.58%.

EXAMPLE 12

From 1,3 - bis - (n - propylamino-diphenylsilyl) - 2,2-diphenyl - 1,3,2 - diazasilacyclopentane and 1,3 - dihydroxy-tetraphenyldisiloxane is obtained a white to yellow polymer which is a hard, brittle mass but can be transformed by pressure below its softening point to transparent sheets. This is also true of the polymers of Examples 8 to 11, i.e., the phenylated derivatives. The same polymers are obtained when 1,3 - bis - (amino - diphenylsilyl)-2,2-diphenyl-1,3,2-diazasilacyclopentane is used instead of the n-propylamine derivative.

Analysis.—$C_{62}H_{54}O_3N_2Si_5$: Calc'd: C, 73.33%; H, 5.36%; N, 2.76%. Found: C, 73.28%; H, 5.43%; N, 2.50%.

THERMOGRAVIMETRIC ANALYSES.—WEIGHT RESIDUE, PERCENT

[Heating rate, 2.8° C./min.; atmosphere, nitrogen]

| Polymer of example | 200° | 250° | 300° | 350° | 400° | 450° | 500° | 550° | 600° | 650° | 700° | 750° | 800° | 850° | 900° |
|---|---|---|---|---|---|---|---|---|---|---|---|---|---|---|---|
| 1 | 100 | 100 | 100 | 99.5 | 97.5 | 93.5 | 81.5 | 54.5 | 42 | 37 | 35 | 34.5 | 34 | 33.5 | 33 |
| 2 | 100 | 99.5 | 98.5 | 97 | 95 | 90 | 56 | 28.5 | 25.5 | 24.5 | 24.5 | 24.5 | 24.5 | 24.5 | 24.5 |
| 3 | 100 | 100 | 98.5 | 97 | 93.5 | 89 | 65 | 42 | 31.5 | 29 | 29 | 28.5 | 28.5 | 28 | 28 |
| 4 | 99.5 | 98 | 96.5 | 95 | 92 | 87 | 57 | 32.5 | 26.5 | 23 | 22 | 21.5 | 21 | 20.5 | 20 |
| 5 | 98.5 | 97 | 96 | 93.5 | 90 | 81.5 | 38.5 | 21 | 18.5 | 17.5 | 16.5 | 16 | 15 | 14 | 13 |
| 6 | 100 | 100 | 100 | 99.5 | 97 | 91.5 | 74.5 | 42 | 37.5 | 35 | 34 | 33 | 32 | 31 | 30 |
| 7 | 98.5 | 97 | 96 | 96 | 96 | 93 | 85.5 | 61 | 56 | 55 | 55 | 55 | 54.5 | 54.5 | 54.5 |
| 8 | 100 | 99.5 | 99 | 98.5 | 97.5 | 95 | 88.5 | 66.5 | 59 | 56 | 55 | 55 | 55 | 55 | 54.5 |
| 9 | 100 | 100 | 100 | 100 | 99 | 96.5 | 89.5 | 68.5 | 60.5 | 57 | 57 | 57 | 56.5 | 56.5 | 56 |
| 10 | 100 | 100 | 99.5 | 99 | 97 | 88.5 | 88.5 | 66.5 | 60.5 | 58 | 57.5 | 57.5 | 57.5 | 57.5 | 57.5 |
| 11 | 99 | 98.5 | 96 | 96 | 96 | 93.5 | 78.5 | 47.5 | 41 | 38 | 37 | 37 | 37 | 37 | 37 |

THERMOGRAVIMETRIC ANALYSES.—WEIGHT RESIDUE, PERCENT

[Heating rate, 2.8° C./min.; atmosphere, air]

| Polymer of example | 200° | 250° | 300° | 350° | 400° | 450° | 500° | 550° | 600° | 650° | 700° | 750° | 800° | 850° | 900° |
|---|---|---|---|---|---|---|---|---|---|---|---|---|---|---|---|
| 1 | 98.5 | 97.5 | 96 | 94.5 | 92.5 | 89.5 | 83 | 70.5 | 54.5 | 51.5 | 50 | 49.5 | 47.5 | 46.5 | 46 |
| 9 | 96.5 | 96.5 | 96.5 | 96.5 | 96.5 | 94 | 87.5 | 71.5 | 63.5 | 59.5 | 57.5 | 54 | 53.5 | 51.5 | 48.5 |

THERMOGRAVIMETRIC ANALYSES.—POLYMER OF EXAMPLE 9

[Weight residue, percent; atmosphere, nitrogen]

| Time, hours | 300° C. | 400° C. | 500° C. |
|---|---|---|---|
| 5 | 95 | 92 | 62 |
| 10 | 94.5 | 90 | 61 |
| 15 | 94 | 88 | 60 |
| 20 | 93 | 86 | 58.5 |
| 25 | 92.5 | 84 | 58 |
| 30 | 92 | 82 | 58 |
| 35 | 91.5 | 80 | 58 |

HYDROLYTIC STABILITIES

The hydrolytic stabilities of some polymers prepared were determined. A solvent mixture of dioxane/water (4:1) was selected. Hydrolyses tests were run at pH 7.4 and 10 at constant temperature of 40±0.1° C. The ethylenediamine formed by complete ring cleavage was continuously neutralized with 1/10 N HCl using an automatic titrator. The pH was kept constant during the experiment. The consumption of HCl in percent (based on the theoretical consumption of HCl at complete hydrolysis=100%) is plotted versus time.

In alkaline solution (pH 10) the polymers are completely stable under the conditions used.

From the following table, it becomes apparent that in neutral or acid solution the aromatically substituted polymers possess higher hydrolytic stabilities than the aliphatically substituted polymers.

RATE OF HYDROLYSIS

[Temperature, 40±0.1° C.; solvent, dioxane/water=4:1]

| Polymer of example | 10 h. | 20 h. | 30 h. pH 7 | 40 h. | 50 h. |
|---|---|---|---|---|---|
| 1 | 82 | 88 | 92 | | |
| 3 | 100 | | | | |
| 4 | 100 | | | | |
| 5 | 47 | 79 | 97 | 100 | |
| 6 | 42 | 44.5 | 46 | 47 | |
| 7 | 12.5 | 21 | 27.5 | 40 | |
| 9 | 6 | 7.5 | 8 | 9 | 10 |
| 11 | 2 | 3.5 | 5 | 6.5 | 8 |

| | | | pH 4 | | |
|---|---|---|---|---|---|
| 1 | 100 | | | | |
| 5 | 65.6 | 85 | 94 | | |
| 9 | 45.5 | 51 | 56.5 | 61.5 | |
| 11 | 17.5 | 27 | 35 | 41 | 47 |

SOFTENING POINTS

The softening points are defined by the temperature at which a metal rod, exhibiting a pressure of 2.3 kg./cm.², enters a compact piece of polymer (5 mm. high) ⅗ of its size. A constant rate of heating of 2° per minute was applied.

| Polymer of example— | Softening point° C. ±3° |
|---|---|
| 1 | 84 |
| 2 | 30 |
| 3 | 30 |
| 4 | 25 |
| 5 | 61 |
| 6 | Liq. |
| 7 | 39 |
| 8 | 82 |
| 9 | 200 |
| 10 | 90 |
| 11 | 102 |
| 12 | 84 |

What I claim is:

1. A process for preparing silicon-, nitrogen- and oxygen-containing high temperature resistant polymers consisting of repeating units of the general formula

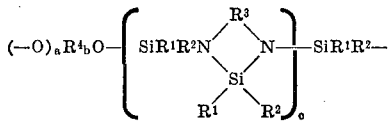

in which $R^1$ and $R^2$ are identical or different fluorine atoms or hydrocarbyl groups; $R^3$ is a bivalent hydrocarbon group and the two nitrogen atoms are attached to $R^3$ in 1,2- or 1,3-aliphatic, or ortho- or peri-position aromatic; $R^4$ is a silyl group of the formula $—(R^6)_2Si—R^5—Si(R^6)_2—$ or $—(R^6)_2Si—O—Si(R^6)_2—$ wherein $R^5$ is hydrocarbylene and $R^6$ is hydrocarbyl, a group of the formula

where $R^5$ is hydrocarbylene and A is O, S, $S_2$, SO, $SO_2$,

NR', NSiR*₃, SiR*₂, SiR*₂SiR*₂, SiR*₂OSiR*₂
SiR*(SiR*₃)SiR*₂, SiR*(OSiR*₃)OSiR*₂, Si(SiR*₃)₂

Si(OSiR*₃)₂, P(O)R", P(S)R" or BR" where R" is a hydrocarbyl or hydrocarbyloxy group; R' is R" or hydrogen atoms; R* is R" or fluorine atom; $a$ is 0 or 1–6 and when $b$ is 0 $a$ is 0, $b$ is 0 or 1, and $c$ is an integer of 1–10 and preferably 1, characterized in that a monomeric to oligomeric compound of the general formula

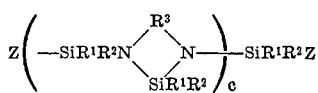

is reacted with a hydroxy compound of the formula $R^4(OH)_d$ where $R^4$ is as defined above and $d$ is an integer of at least 2, $R^1$, $R^2$ and $c$ are defined as above and Z is the $NH_2$ group or a secondary or tertiary amino group of the formula $—NR^7_2$ where at least one $R^7$ is hydrocarbyl derived from an amine which is more volatile than the hydroxy compound, or a chlorine or bromine atom when an alkali salt of said hydroxy compound is reacted at a temperature sufficient to split off ammonia or amine or to cause separation of the alkali halide.

2. A process of claim 1 wherein $R^1$ and $R^2$ are hydrocarbyl, $R^3$ and $R^4$ are hydrocarbylene, $a$ is 1, $b$ is 1, $d$ is 2 and Z is an amino group.

3. A process of claim 1 wherein $R^1$ and $R^2$ are hydrocarbyl, $R^3$ is hydrocarbylene, $R^4$ is of the formula $—(R^6)_2Si—R^5—Si(R^6)_2—$ wherein $R^5$ is hydrocarbylene and $R^6$ is hydrocarbyl, $a$ is 1, $b$ is 1, $d$ is 2 and Z is an amino group.

4. A process of claim 1 wherein $R^1$ and $R^2$ are hydrocarbyl, $R^3$ is hydrocarbylene, $R^4$ is of the formula $—(R^6)_2Si—O—Si(R^6)_2—$ wherein $R^6$ is hydrocarbyl, $a$ is 1, $b$ is 1, $d$ is 2 and Z is an amino group.

5. A silicon-, nitrogen- and oxygen-containing high temperature resistant polymer consisting of repeating units of the general formula

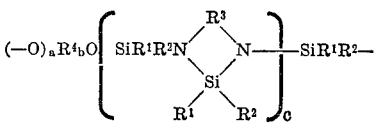

in which $R^1$ and $R^2$ are identical or different fluorine atoms or hydrocarbyl groups; $R^3$ is a bivalent hydrocarbon group and the two nitrogen atoms are attached to $R^3$ in 1,2- or 1,3- aliphatic, or ortho- or peri-position aromatic; $R^4$ is a silyl group of the formula $—(R^6)_2Si—R^5—Si(R^6)_2—$ or $—(R^6)_2Si—O—Si(R^6)_2—$ wherein $R^5$ is hydrocarbylene and $R^6$ is hydrocarbyl, a group of the formula

where $R^5$ is hydrocarbylene and A is O, S, $S_2$, SO, $SO_2$,

NR', NSiR*₃, SiR*₂, SiR*₂SiR*₂, SiR*₂OSiR*₂
SiR*(SiR*₃)SiR*₂, SiR*(OSiR*₃)OSiR*₂, Si(SiR*₃)₂,

Si(OSiR*$_3$)$_2$, P(O)R″, P(S)R″, or BR″ where R″ is a hydrocarbyl or hydrocarbyloxy group; R′ is R″ or hydrogen atom; R* is R″ or fluorine atom; $a$ is 0 or 1–6 and when $b$ is 0 $a$ is 0, $b$ is 0 or 1, and $c$ is an integer of 1–10 and preferably 1.

6. A polymer of claim 5 wherein R$^1$ and R$^2$ are hydrocarbyl, R$^3$ and R$^4$ are hydrocarbylene, $a$ is 1 and $b$ is 1.

7. A polymer of claim 5 wherein R$^1$ and R$^2$ are hydrocarbyl, R$^3$ is hydrocarbylene, R$^4$ is of the formula —(R$^6$)$_2$Si—R$^5$—Si(R$^6$)$_2$— wherein R$^5$ is hydrocarbylene and R$^6$ is hydrocarbyl, $a$ is 1 and $b$ is 1.

8. A polymer of claim 5 wherein R$^1$ and R$^2$ are hydrocarbyl, R$^3$ is hydrocarbylene, R$^4$ is of the formula —(R$^6$)$_2$Si—O—Si(R$^6$)$_2$— wherein R$^6$ is hydrocarbyl, $a$ is 1 and $b$ is 1.

9. A polymer of claim 5 wherein R$^1$ and R$^2$ are methyl, R$^3$ is —CH$_2$CH$_2$—, R$^4$ is the 4,4′-biphenylene group, $a$ is 1, $b$ is 1 and $c$ is 1.

10. A polymer of claim 5 wherein R$^1$ and R$^2$ are methyl, R$^3$ is —CH$_2$CH$_2$—, R$^4$ is the bis-(4-phenylene)-dimethylmethane group, $a$ is 1, $b$ is 1 and $c$ is 1.

11. A polymer of claim 5 wherein R$^1$ and R$^2$ are methyl, R$^3$ is —CH$_2$CH$_2$—, R$^4$ is the 4,4′-bisphenylene group, $a$ is 1, $b$ is 1 and $c$ is 2.

12. A polymer of claim 5 wherein R$^1$ and R$^2$ are methyl, R$^3$ is —CH$_2$CH$_2$—, R$^4$ is the 4,4′-bisphenylene group, $a$ is 1, $b$ is 1 and $c$ is 3.

13. A polymer of claim 5 wherein R$^1$ and R$^2$ are methyl, R$^3$ is —CH$_2$CH$_2$—, R$^4$ is the 4,4′-biphenylene group, $a$ is 1, $b$ is 1 and $c$ is 4.

14. A polymer of claim 5 wherein R$^1$ and R$^2$ are methyl, R$^3$ is —CH$_2$CH$_2$—, R$^4$ is 1,4-phenylene, $a$ is 1, $b$ is 1 and $c$ is 1.

15. A polymer of claim 5 wherein R$^1$ and R$^2$ are methyl, R$^3$ is —CH$_2$CH$_2$—, R$^4$ is bis-(diphenylsilylene)-4,4′-phenylene, $a$ is 1, $b$ is 1 and $c$ is 1.

16. A polymer of claim 5 wherein R$^1$ and R$^2$ are phenyl, R$^3$ is —CH$_2$CH$_2$—, R$^4$ is 1,4-phenylene, $a$ is 1, $b$ is 1 and $c$ is 1.

17. A polymer of claim 5 wherein R$^1$ and R$^2$ are phenyl, R$^3$ is —CH$_2$CH$_2$—, R$^4$ is 4,4′-biphenylene, $a$ is 1, $b$ is 1 and $c$ is 1.

18. A polymer of claim 5 wherein R$^1$ and R$^2$ are phenyl, R$^3$ is —CH$_2$CH$_2$—, R$^4$ is bis-(4-phenylene)-dimethylmethane, $a$ is 1, $b$ is 1 and $c$ is 1.

19. A polymer of claim 5 wherein R$^1$ and R$^2$ are phenyl, R$^3$ is —CH$_2$CH$_2$—, R$^4$ is bis-(diphenylsilylene)-4,4′-phenylene, $a$ is 1, $b$ is 1 and $c$ is 1.

20. A polymer of claim 5 wherein R$^1$ and R$^2$ are phenyl, R$^3$ is —CH$_2$CH$_2$—, R$^4$ is bis-(diphenylsilylene)oxane, $a$ is 1, $b$ is 1 and $c$ is 1.

References Cited

UNITED STATES PATENTS 3,297,592  1/1967  Fink.

FOREIGN PATENTS 1,425,306  12/1965  France.

Fink: Angew. Chem. Internat. Edit., vol. 5 (1966), No. 9, pp. 760–774.

DONALD E. CZAJA, *Primary Examiner.*

M. I. MARQUIS, *Assistant Examiner.*

U.S. Cl. X.R.

117—124, 135.1, 138.8, 142, 143, 161; 260—2, 37, 79, 79.3, 448.2